March 31, 1931.  J. DUYN  1,799,091
COMBINED RAKE AND TEDDER
Filed Oct. 24, 1928
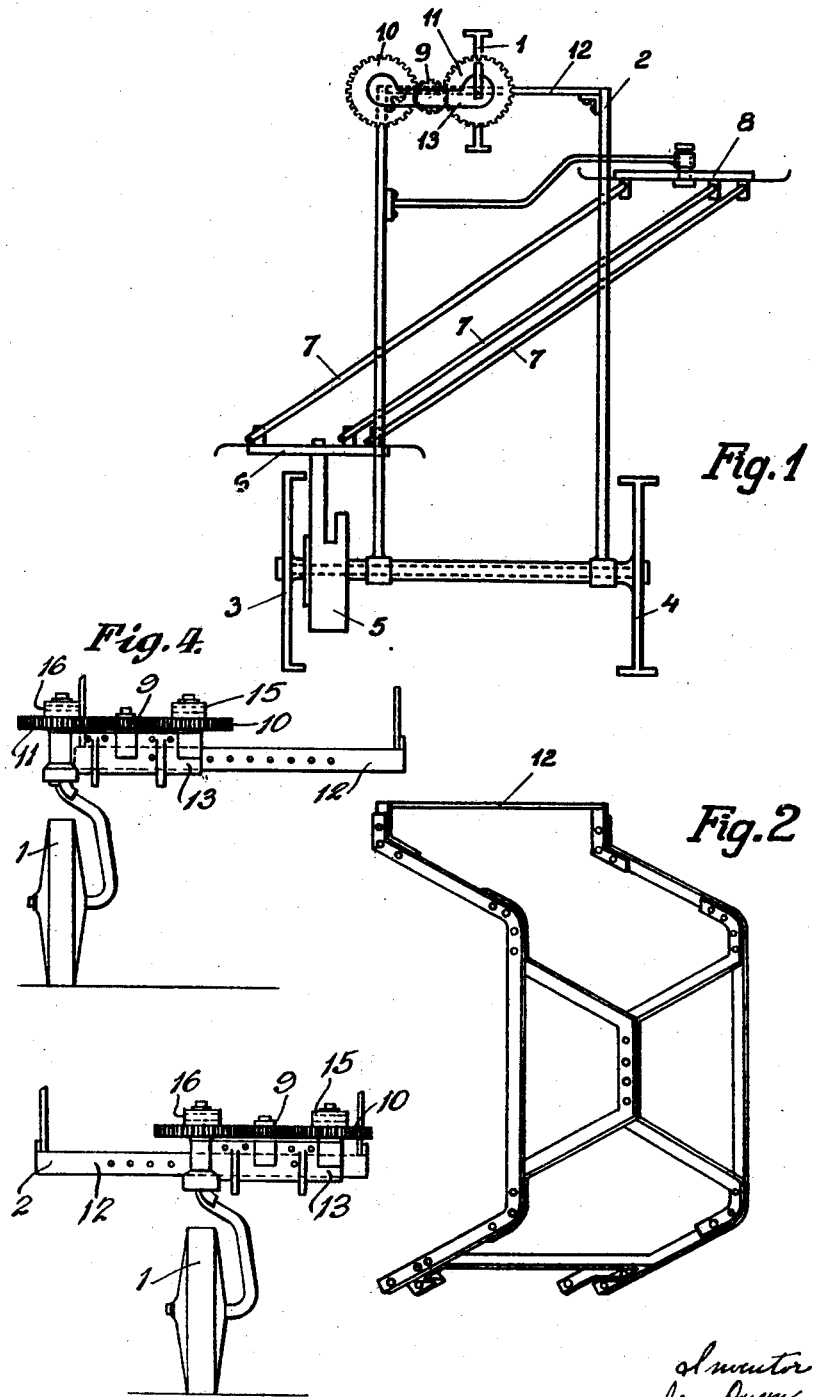

Patented Mar. 31, 1931

1,799,091

UNITED STATES PATENT OFFICE

JAN DUYN, OF WOGMEER-SPIERDIJK, NETHERLANDS

COMBINED RAKE AND TEDDER

Application filed October 24, 1928, Serial No. 314,790, and in the Netherlands November 2, 1927.

This invention relates to a machine for the turning over, the shaking and the raking of hay. For these kinds of machines two arrangements are known. In the first, most common arrangement there are in front two large wheels, from the axle of which the driving of the rake takes place, and only one small wheel aft. The various disadvantages resulting therefrom, e. g. the stubborness of the horses because the thill shaft must be turned off when the machine must be reversed, have caused the application of the second arrangement in which the two large wheels are placed aft and the small wheel fore.

The invention relates to machines with the second arrangement and has for its object to make them adapted for grounds with many holes e. g. turf-fields with pits, where there are experienced great difficulties because of the roughness of the ground when shaking and turning over the hay.

In order to render the machine also suitable for unlevelled places, it is of great importance, that the efficient depth of the teeth should vary with the roughness of the ground. To this end it is necessary, that the points of support of the wheels be placed as near as possible to the teeth and furthermore that the outermost teeth extend as little as possible outside the triangle formed by the points of support of the three wheels.

This purpose is secured by providing the frame at the front side with a cross-beam, to which the steering-wheel is secured in such a manner, that it may be adjusted transversely of the machine. The steering-wheel is therefore suitably provided with a slide-rod 13, which is slidable along the cross-beam and can be fixed thereupon and this slide-rod is provided with a draw-hook, to which a toothed wheel is secured, whilst a corresponding toothed wheel is secured to the steering-wheel and these two toothed-wheels are coupled together by means of an intermediate toothed-wheel.

The invention will be made clear with the help of a drawing showing by way of example a form of execution and therein is Fig. 1 a plan-view of the machine and Fig. 2 a perspective view of the frame to which the wheels and the driving-work are secured.

Fig. 3 is a partial front elevational view showing the front wheel in the central position, and Fig. 4 is a similar view showing the front wheel at a side position.

The frame, to which the back-wheels are secured, is provided with a cross-beam 12 for the steering-device. This device is composed of a small front-wheel 1 which is provided with a slide-rod 13, slidable along the cross-beam and which can be fixed thereupon, and to which the draw-hooks 15 and 16 can be secured. By these means the steering-wheel can be placed in the position represented in Figure 1 in the middle of the cross-beam and also to the right near the point 2.

By the axle of the back-wheels 3 and 4 the disk 6 is rotated in either direction and with different velocities by means of a gearing 5. To this disk 6 three rods 7 are secured, which are likewise secured to a rotatable disk 8 arranged at the front of the machine, hence the motion of the machine will cause the rods 7 to rotate parallel to each other. To these rods 7 the teeth are secured, which throw up the hay. For the shaking and turning over of the hay only the ends of the rods 7 are provided with teeth, whilst for the raking the rods 7 are provided with teeth throughout the full length.

When shaking the hay the teeth will rotate with great speed in a direction opposite to the motion, so that the heap of hay will be shaken to pieces.

When turning over the hay the teeth will rotate with a low speed, so that a heap of hay will be turned over and when raking the same occurs, but because the rods 7 are provided with teeth over the full length the result will be a combination of two heaps into a single one.

When shaking the hay the wheels 3 and 4 will pass the heap of hay at the right side and when turning over and raking they will pass at the left side.

Especially if the hay lying on the ground is very flat by reason of rain and clings to the ground as fresh grass, it is very essential that the teeth rotate as close as possible to the ground and hence the teeth be lifted as little as possible when the wheels pass the uneven spots. If the front-wheel is positioned in proximity of point 2, that is to say pushed as far as possible to the right, the triangle formed by the points of support of the three wheels on the ground, lies in such a manner, that the outermost teeth extend as little as possible outside this triangle, the vertical displacements of the teeth will be as slight as possible when one of the wheels in consequence of the unevenness is displaced vertically.

When raking a broader heap of hay must be put aside and then it is not desirable to keep the front-wheel at the side. For it would be impossible to have the large heap of hay passed through the opening between the front-wheel and the teeth and besides the front-wheel as well as the beast of draught has then to go through the bulk of hay, this rendering the work heavy and hard.

As the front-wheel is slidable along the cross-beam, so it may be placed in the middle or upon a side according to circumstances.

By this improvement of the machine the advantage is obtained that same is also adapted to be applied for the treatment of hay lying on steep sides of ditches and trenches.

It is then, however, very desirable, that in the position of the front-wheel to the right the beast of draught is not yoked just before this wheel, because the beast cannot walk along the steep and slippery sides.

To obviate this disadvantage the draw-hook 15 is provided with a toothed-wheel 10 whilst a corresponding toothed-wheel 11 is secured to the steering-wheel having a draw-hook 16, both wheels being coupled together by an intermediate toothed-wheel 9.

When the front-wheel is in the outermost position to the right, the beast of draught can nevertheless be yoked in the middle of the machine, because the movements of the draw-hook to the left or to the right, which are required to follow the winding course and for the steering in general, are transmitted by the toothed-wheels 10, 9 and 11 to the front-wheel.

If the front-wheel is placed in the middle of the machine, i. e. when raking, the transmission of the movements of the draw-hook is effected to the front-wheel immediately, the toothed-wheels then rotating freely.

What I claim is:

1. Machine for the turning over, the shaking and raking of hay comprising a draw-hook, a rotatable and toothed cylinder and a frame provided with two back-wheels and a single front-wheel in combination with means to render the front-wheel adjustable crosswise the machine and means to transmit the movements of the draw-hook to the front-wheel.

2. Machine for the turning over, the shaking and raking of hay comprising a draw-hook, a rotatable and toothed cylinder, a frame provided with two back-wheels and a single front-wheel, a cross-beam which is secured to the frame, in combination with means to adjust the front-wheel along this cross-beam and means to transmit the movements of the draw-hook to the front-wheel.

3. Machine for the turning over, the shaking and raking of hay comprising a rotatable and toothed cylinder, a draw-hook, a frame provided with two back-wheels and a single front-wheel, a cross-beam which is secured to the frame, and a slide rod slidable along said crossbeam, a front-wheel secured to said slide rod, means for securing said slide rod to said crossbeam at various adjusted positions and means to transmit the movements of said draw-hook to said front-wheel.

4. Machine for the turning over, the shaking and raking of hay comprising a rotatable and toothed cylinder, a draw-hook, a frame provided with two back-wheels and a single front-wheel, a cross-beam which is secured to the frame, a slide-rod which is slidable along the cross-beam and can be fixed thereupon, a front wheel secured to said slide rod and which is provided with said draw-hook, a toothed wheel upon said slide rod, a corresponding toothed-wheel secured to said front-wheel and an intermediate toothed wheel meshing with said first mentioned toothed wheels.

In testimony whereof I affix my signature, at the city of Amsterdam, this 4th day of October, 1928.

JAN DUYN.